(12) United States Patent
Krampitz et al.

(10) Patent No.: US 7,134,324 B2
(45) Date of Patent: Nov. 14, 2006

(54) ALTERNATOR HOLDING APPARATUS AND METHOD FOR ALTERNATOR TESTING

(75) Inventors: Scott Krampitz, Blooming Prairie, MN (US); Garret Miller, Owatonna, MN (US); Kurt Raichle, Plymouth, MN (US); Andrew Michael Harrigan, Waseca, MN (US); Jason Murphy, Austin, MN (US); Scott Opsahl, Lakeville, MN (US)

(73) Assignee: SPX Corporation, Charlotte, NC (US)

( * ) Notice: Subject to any disclaimer, the term of this patent is extended or adjusted under 35 U.S.C. 154(b) by 50 days.

(21) Appl. No.: 10/975,387

(22) Filed: Oct. 29, 2004

(65) Prior Publication Data

US 2006/0090554 A1 May 4, 2006

(51) Int. Cl.
*G01M 15/00* (2006.01)
(52) U.S. Cl. .................................. 73/119 R; 248/676
(58) Field of Classification Search ................ 73/116, 73/117.2, 118.1, 119 R; 248/637, 671, 674, 248/676, 678
See application file for complete search history.

(56) References Cited

U.S. PATENT DOCUMENTS

| | | | | |
|---|---|---|---|---|
| 3,936,744 A * | 2/1976 | Perlmutter | .................. | 324/772 |
| 4,666,122 A * | 5/1987 | Goodard | ...................... | 248/666 |
| 4,849,665 A * | 7/1989 | Kitamura et al. | ......... | 310/68 D |
| 4,945,272 A * | 7/1990 | Ochi et al. | .................... | 310/91 |
| 4,980,589 A * | 12/1990 | Ochi et al. | ................ | 310/66 D |
| 5,541,840 A | 7/1996 | Gurne et al. | ........... | 364/424.03 |
| 5,550,485 A * | 8/1996 | Falk | ........................... | 324/772 |
| 5,689,517 A | 11/1997 | Ruparel | ..................... | 371/22.3 |
| 5,705,870 A * | 1/1998 | Thomsen et al. | ............. | 310/91 |
| 5,938,169 A * | 8/1999 | Ogawa et al. | ............... | 248/674 |
| 6,009,363 A | 12/1999 | Beckert et al. | ................ | 701/33 |
| 6,026,461 A | 2/2000 | Baxter et al. | ............... | 710/244 |
| 6,147,426 A * | 11/2000 | Lepi et al. | ..................... | 310/91 |
| 6,175,789 B1 | 1/2001 | Beckert et al. | ................ | 701/33 |
| 6,181,992 B1 | 1/2001 | Gurne et al. | ................... | 701/29 |
| 6,226,305 B1 | 5/2001 | McLoughlin et al. | ........ | 370/532 |
| 6,292,931 B1 | 9/2001 | Dupenloup | ................... | 716/18 |
| 6,304,012 B1 * | 10/2001 | Chen et al. | .................... | 310/58 |
| 6,304,016 B1 * | 10/2001 | Frederick et al. | ............. | 310/91 |
| 6,394,250 B1 * | 5/2002 | Ouchi | .......................... | 192/45 |
| 6,480,723 B1 | 11/2002 | Davidson et al. | ........... | 455/557 |
| 6,553,039 B1 | 4/2003 | Huber et al. | ................. | 370/466 |
| 6,634,896 B1 | 10/2003 | Potega | ....................... | 439/218 |
| 6,647,027 B1 | 11/2003 | Gasparik et al. | ............ | 370/519 |
| 6,687,263 B1 | 2/2004 | van Oldenborgh et al. | . | 370/476 |
| 6,704,829 B1 | 3/2004 | Hoshi et al. | ................. | 710/305 |
| 6,738,696 B1 | 5/2004 | Oi | ................................ | 701/29 |
| 2004/0108855 A1 * | 6/2004 | Raichle | ....................... | 324/378 |
| 2004/0118194 A1 * | 6/2004 | Raichle | ....................... | 73/118.1 |
| 2004/0163501 A1 * | 8/2004 | Chen | .......................... | 81/177.1 |

* cited by examiner

*Primary Examiner*—Eric S. McCall
(74) *Attorney, Agent, or Firm*—Baker & Hostetler LLP

(57) ABSTRACT

An apparatus for supporting an alternator for testing has a base, a turret having a socket defined therein, and a holding pin having two ends with a head at one end adapted to be inserted into the socket and retained therein. An elongated extension portion extends from the turret when the head is inserted in the socket, and engages with a portion of the alternator.

20 Claims, 17 Drawing Sheets

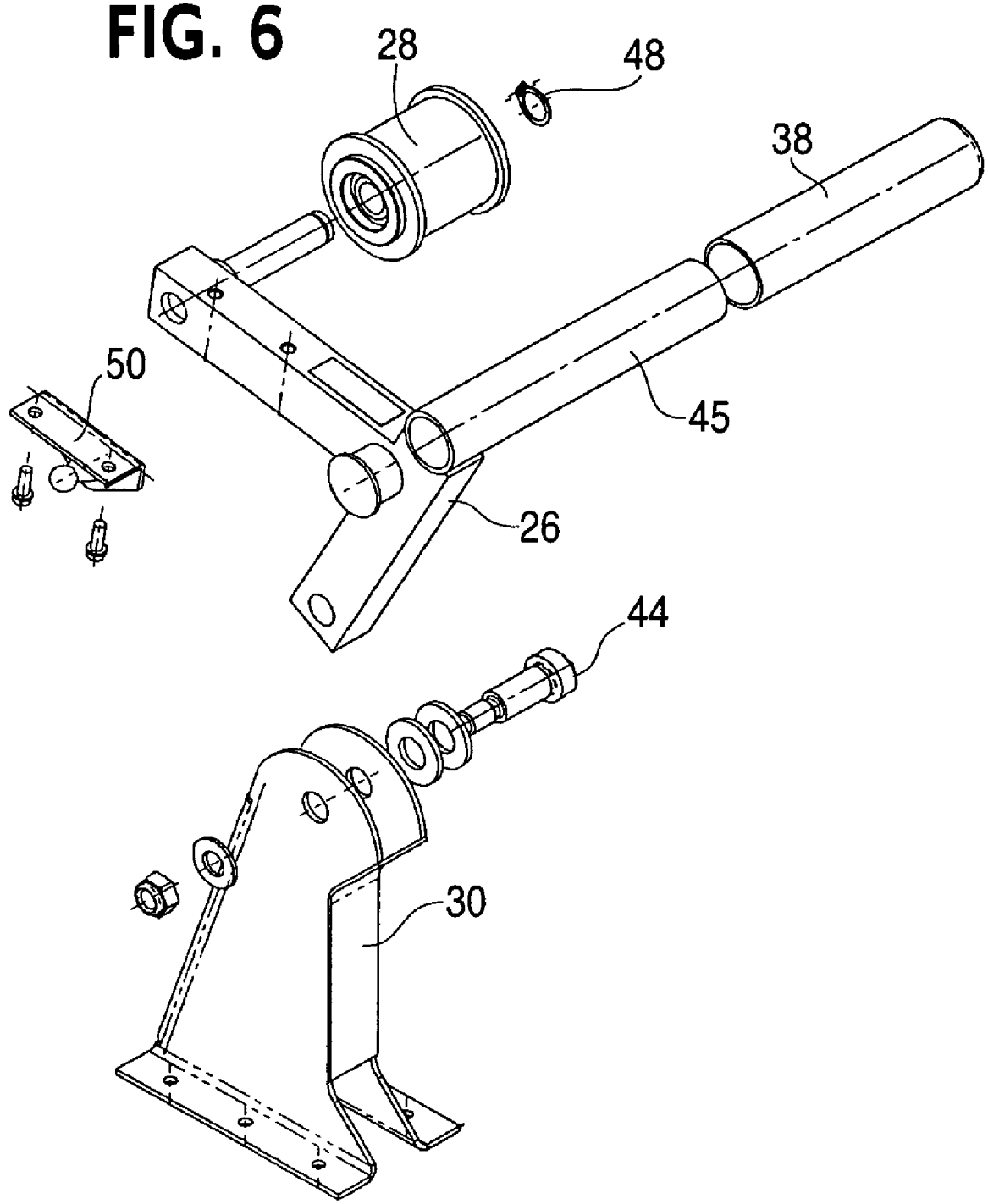

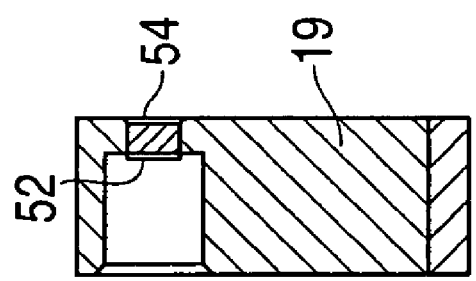
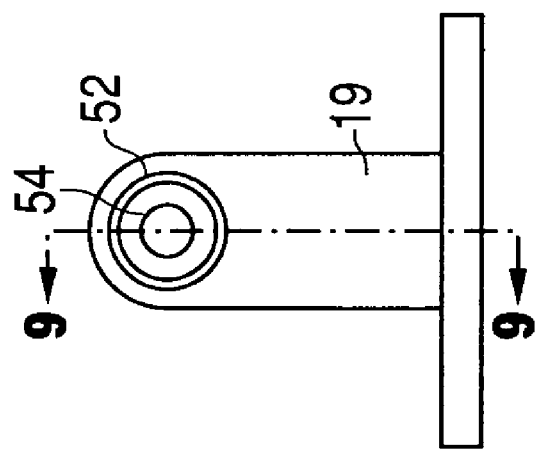
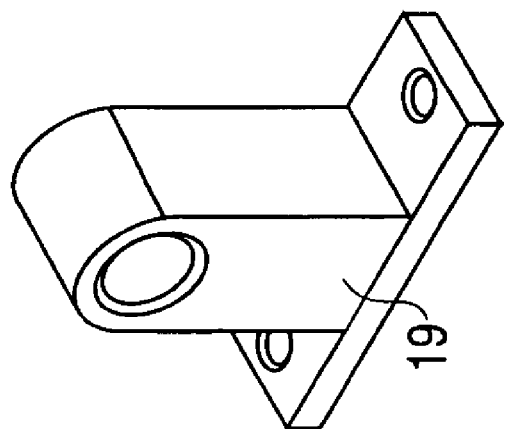

ALTERNATOR HOLDING APPARATUS AND METHOD FOR ALTERNATOR TESTING

FIELD OF THE INVENTION

The present invention pertains the field of the testing of vehicle motor rotary accessory devices, such as for example, alternators and/or starter motors. More particularly, the invention relates to mounting and/or belt tensioning with respect to bench testing (or off-vehicle testing) of such rotary devices.

BACKGROUND OF THE INVENTION

It is well known in the vehicle industry that certain rotary accessory devices are often used in connection with vehicle motors. Two such well known accessory devices are alternators and starter motors. Alternators are used in connection with an engine, typically by being driven by a belt that is driven by the engine. Alternators have internal components which when rotated supply electrical power which may be used in the vehicle and/or engine. Alternators are typically removably but rigidly mounted via a bracket to the engine block or the chassis of the vehicle. In many cases, where a standard type of alternating mounting arrangement is used, the alternator has "ears" with holes that are mounted onto a post or belt attached to the vehicle permitting pivoting of the alternator so that the alternator can be pivoted around the post against the belt tension in order to install and remove belts, and provide a suitable tension when the belt is installed.

Starter motors are electrical motors which are typically removably but rigidly mounted to an engine or transmission casing and which have an electrically driven pinion gear extending from the starter motor that engages a component, typically gears on the flywheel of the engine, in order to be able to rotate the crank shaft of the engine to start it. There are a wide range of attachment mechanisms for attaching such a starter motor.

It is often desirable to test alternators and/or starter motors at locations where they have been removed from the vehicle, e.g. on a test bench. For example, such testing may be desirable before installing a new alternator or starter or may be desirable for removing an existing alternator or starter for testing when diagnosing vehicle problems.

When testing an alternator, it is desirable to be able to attach a belt to the pulley of the alternator and drive the alternator belt with a motor. This situation requires both (1) a way to securely but removably mount the alternator, and (2) a way to provide the belt tensioning. It would be desirable to have an apparatus and method that is able to conveniently mount the alternator to the overall testing apparatus so that it can be quickly, conveniently, safely, and easily installed and/or removed with respect to the testing apparatus. It would also be desirable to have an apparatus and method that can quickly, conveniently, safely and easily provide tension to a belt that is used to drive the alternator via a motor associated with the testing apparatus.

When testing starter motors, the starter motor is typically connected to a device that provides power to the starter motor so the motor is selectively operated. In such a situation, it is desirable to be able to hold the starter motor in place in a convention location during testing. Thus, it would be desirable to have a method and apparatus that can quickly, conveniently, safely and easily provide a mount for a starter motor in a testing apparatus.

SUMMARY OF INVENTION

In one aspect, an embodiment of the invention provides an apparatus for supporting an alternator for testing, comprising, a base, a turret having a socket defined therein; and a holding pin having two ends with a head at one end adapted to be inserted into the socket and retained therein, and an elongated extension portion that extends from the turret when the head is inserted in the socket, wherein the extension portion engages with a portion of the alternator.

In another aspect, an embodiment of the invention provides an apparatus for supporting an alternator for testing, comprising, a base, mounting means having a socket defined therein, and a holding pin having two ends with a head at one end adapted to be inserted to the socket and retained therein, and an elongated extension portion that extends from the mounting means when the head is inserted in the socket, wherein the extension portion engage with a portion of the alternator.

In one aspect, an embodiment of the invention provides a method for supporting an alternator for testing, comprising, a base, inserting a holding pin into a turret having a socket defined therein with the holding pin having two ends with a head at one end adapted to be inserted to the socket and retained therein and an elongated extension portion that extends from the turret head, and engaging the holding pin with a portion of the alternator.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 is an exploded view showing portions of a belt tensioning arrangement.

FIG. 7 is a perspective view of a turret used in an alternator mounting arrangement.

FIG. 8 is a side view of the turret of FIG. 7.

FIG. 9 is a cross sectional view taken through line 9—9 in FIG. 8.

DETAILED DESCRIPTION

Figure 1:
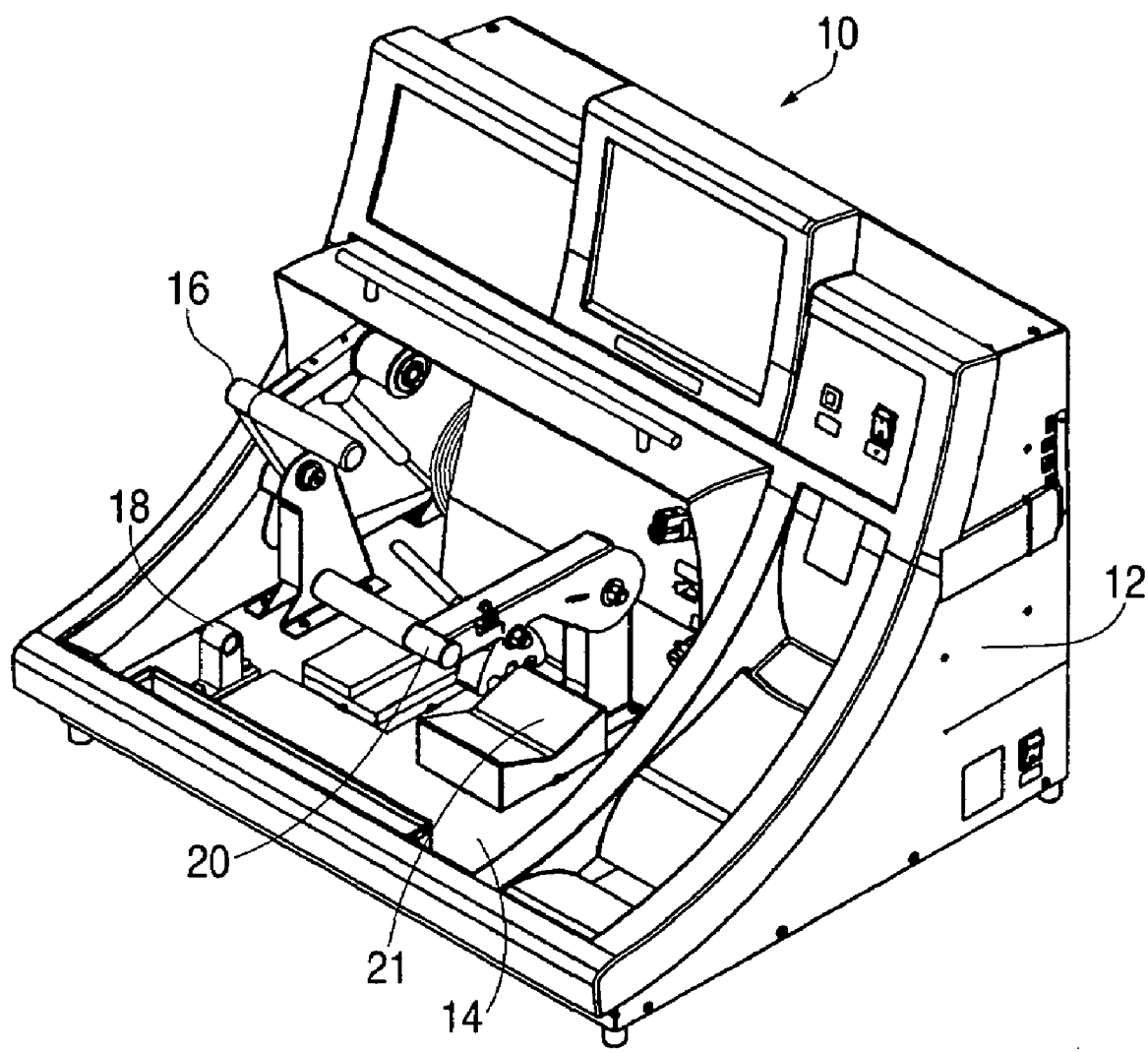
FIG. 1 is a perspective view of a alternator and starter motor testing apparatus according to a preferred embodiment of the present invention.

The invention in some preferred embodiments provides a belt tensioning apparatus and method for alternator testing, as well as an alternator mounting apparatus and method, and also a starter motor holding apparatus and method for starter motor testing. Preferred embodiments of the invention will now be described with reference to the drawing figures, in which like reference numerals refer to like parts throughout.

FIG. 1 illustrates an alternator and/or starter motor testing device 10 including a housing 12 and a base plate (or chassis) 14. The housing 12 surrounds and supports various operative components of the testing device 10 including for example a power supply, diagnostic electronics, a display, a closable front cover, and the like.

The testing device 10 also includes an alternator belt tensioning arrangement generally designated 16, an alternator mounting arrangement generally designated 18, and a starter holder arrangement generally designated 20. Each of the belt tensioning arrangement 16, the alternator mounting arrangement 18, and the starter motor holder arrangement 20 are mounted directly to the base plate 14. A resilient pad 21, associated with the starter motor holder 20, and illustrated in FIG. 1, will be referred to in the description below.

Figure 2:
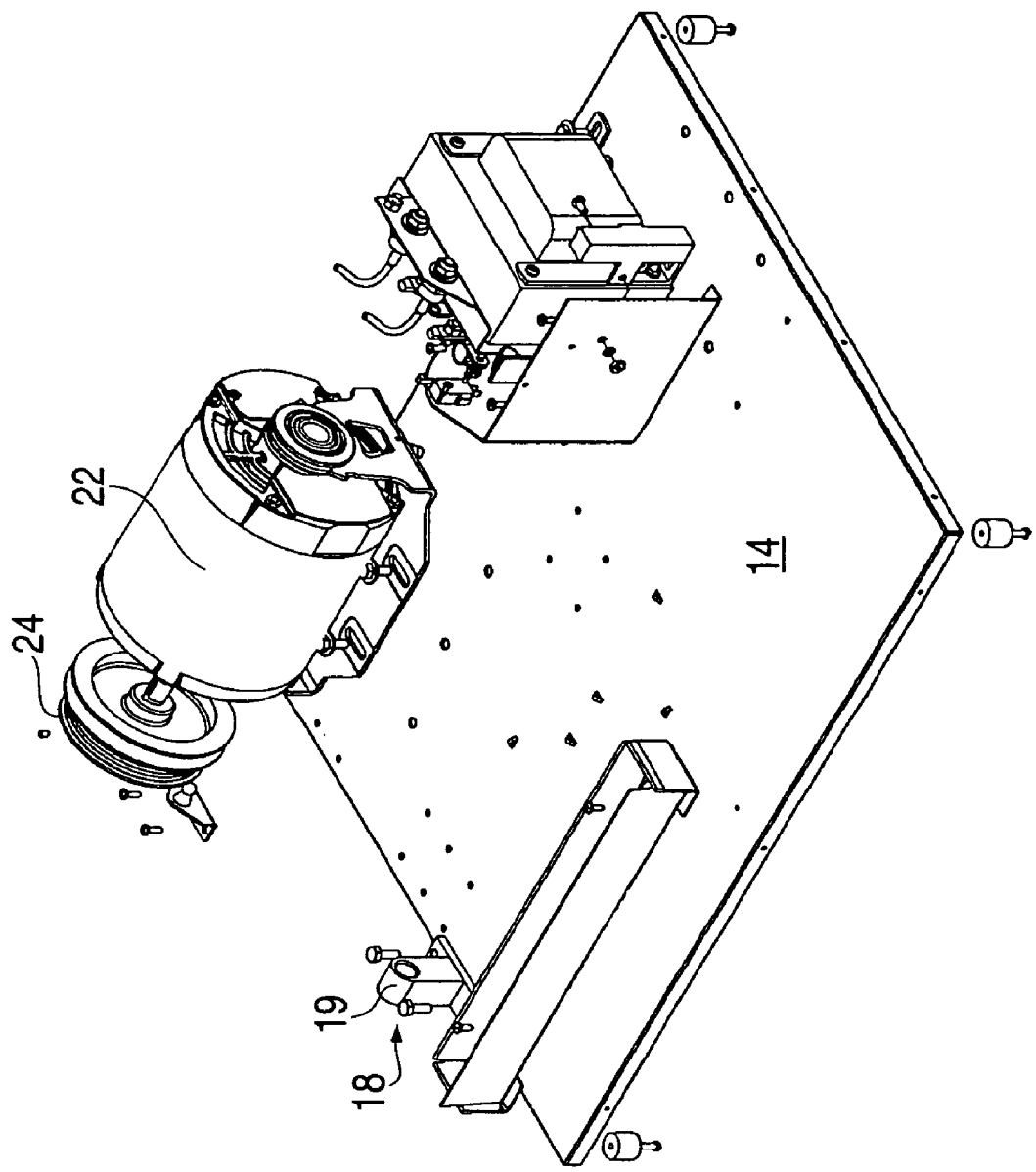
FIG. 2 is a perspective view showing a base plate of the testing apparatus with a motor and alternator mounting components.

Turning to FIG. 2, the base plate 14 is shown having a turret 19 of the alternator mounting arrangement 18. The turret 19 is mounted to the base plate 14 by bolts or other suitable attachment devices. FIG. 2 also illustrates a motor 22 that may be used to drive an alternator belt during alternator testing via a pulley 24. Motor 22 maybe directly mounted to the base plate 14 by bolts or other suitable attachment devices.

The pulley 24 is a preferred embodiment that has a dual pulley, with two adjacent grooves, e.g. a V-belt type groove and a multi-groove (serpentine) belt type groove. The alternator mounting arrangement 18 provides some lateral adjustment of the alternator, so that the alternator mounting is flexible enough to allow the alternator to be positioned relative to the motor to allow either belt type to have proper alignment between the pulley 24 groove in use and the alternator pulley. Alternatively, a single pulley of any type may be used.

Figure 3:
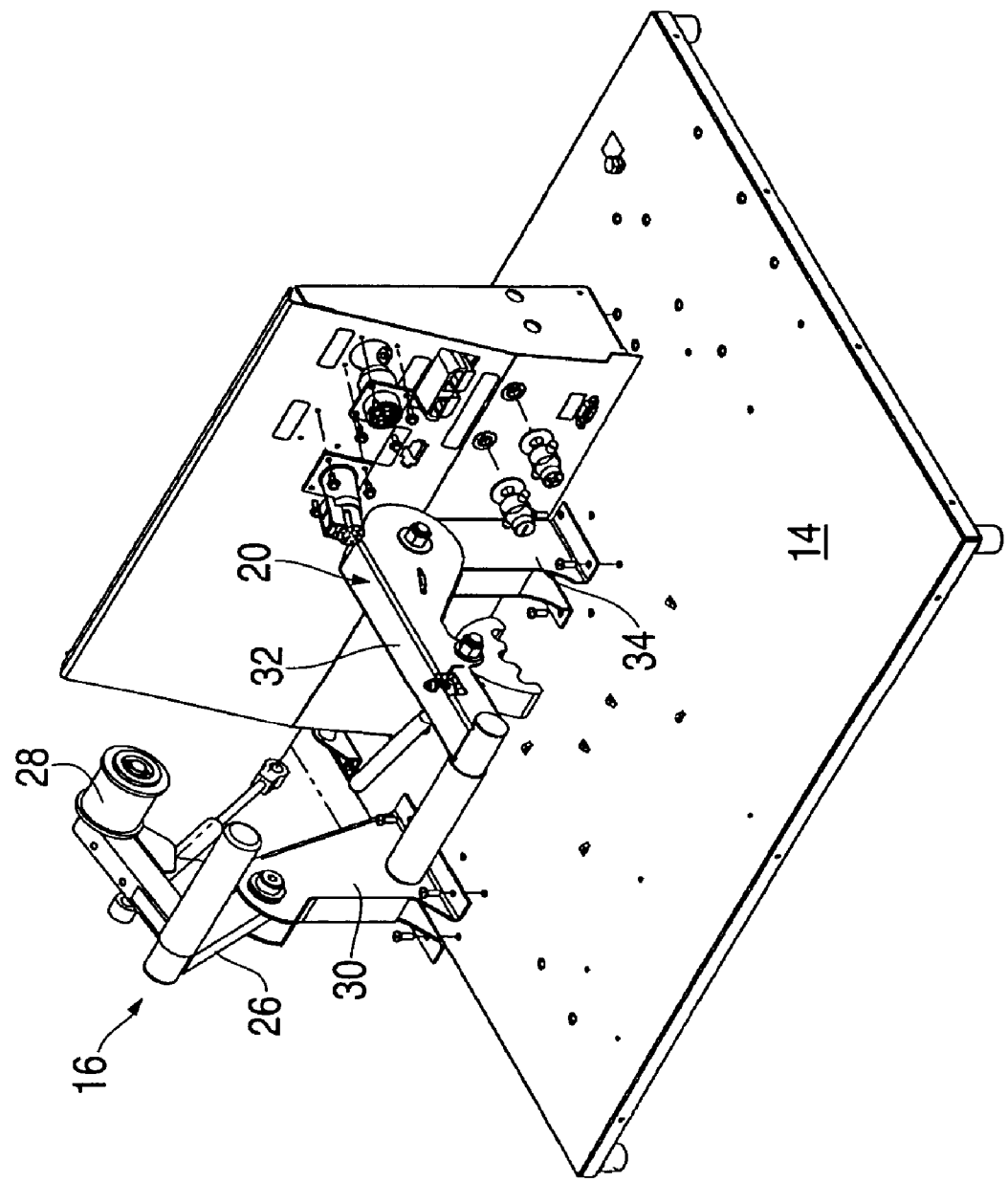
FIG. 3 is a perspective view showing a base plate of a testing apparatus and showing portions of a belt tension arrangement and a starter motor holding arrangement.

Turning to FIG. 3, also mounted to the base plate 14 are portions of the alternator belt tensioning arrangement 16. The alternator belt tensioning arrangement 16 includes a pivoting idler arm 26 having an idler pulley 28, with the pivoting idler arm 26 pivotally mounted to an idler arm support 30. The idler arm support 30 is mounted to the base plate 14 by bolts or other suitable attachment devices. FIG. 3 also illustrates portions of the starter holder arrangement 20, including a hold down arm 32 which is pivotally attached to a hold down arm support member 34. The hold down arm support member 34 may be attached to the base plate 14 by bolts or other suitable attachment devices.

Figure 4:
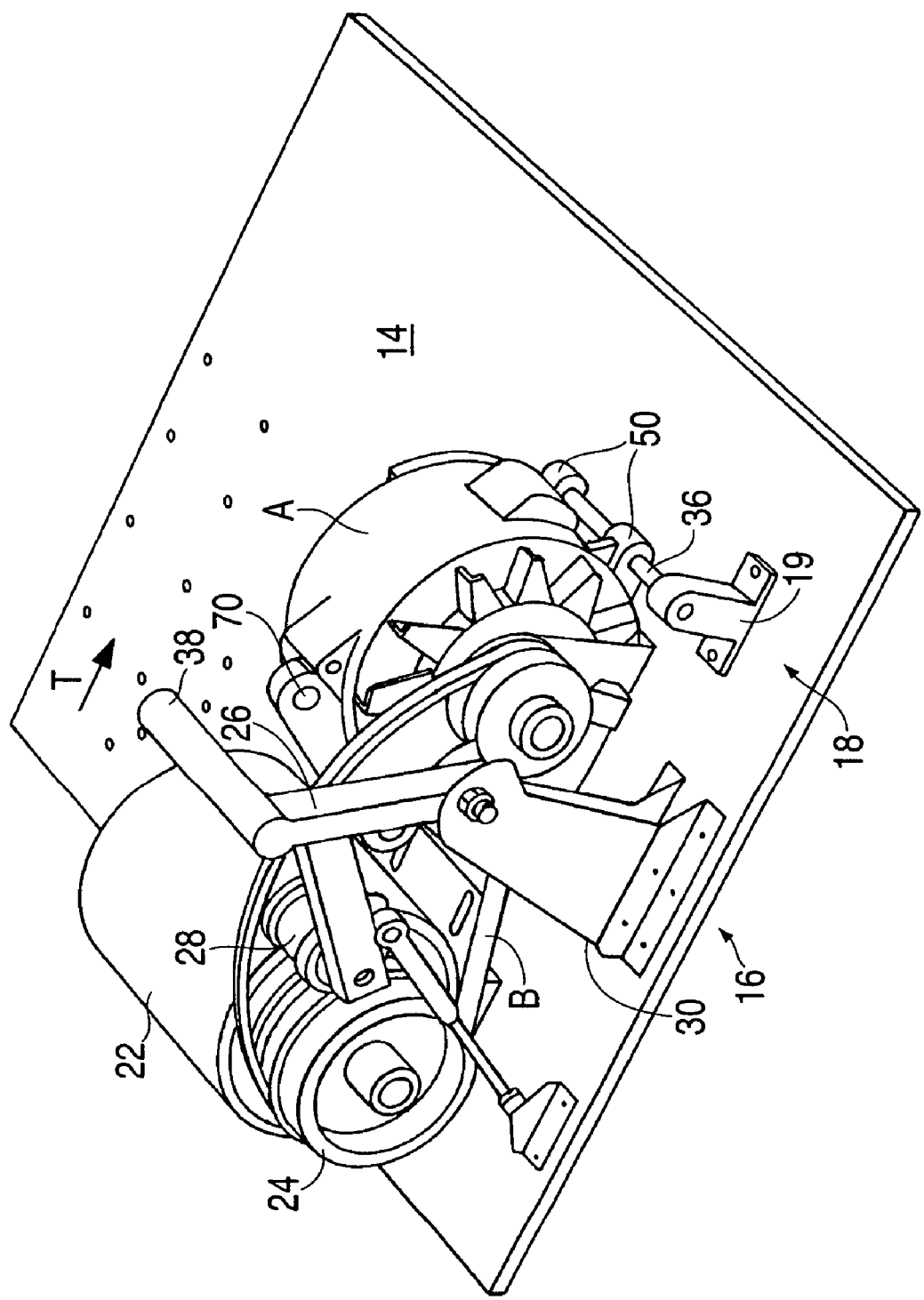
FIG. 4 is a perspective view showing a base plate and a belt tensioning arrangement in a loose position.
Figure 5:
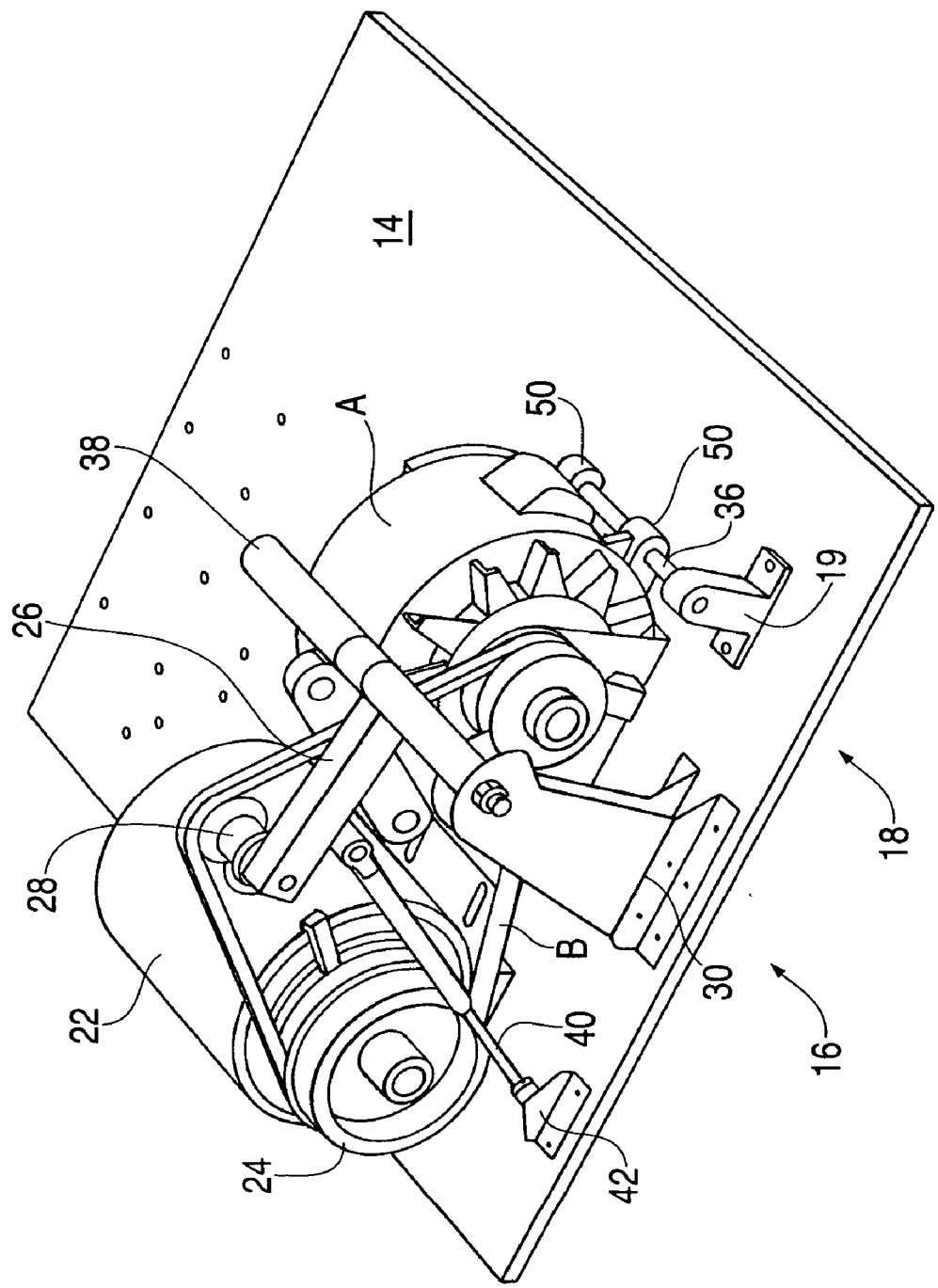
FIG. 5 is a perspective view showing a base plate and a belt tensioning arrangement in a tensioned position.
Figure 10:
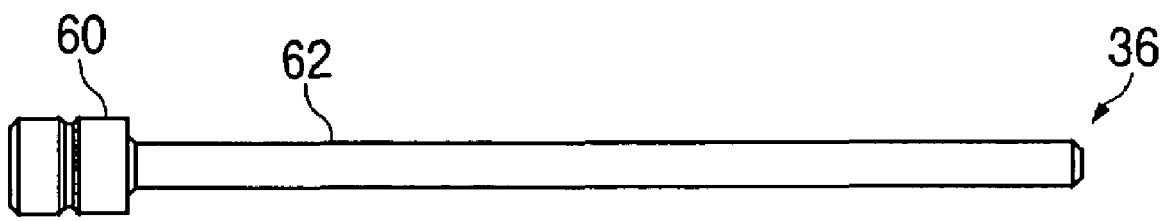
FIG. 10 is a side view of a holding pin.
Figure 11:
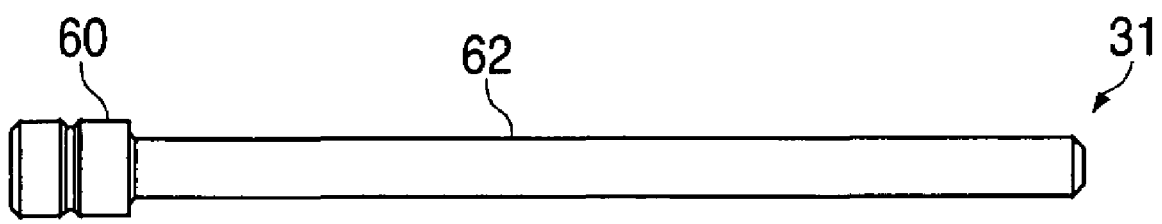
FIG. 11 is a side view of an alternative holding pin.
Figure 12:
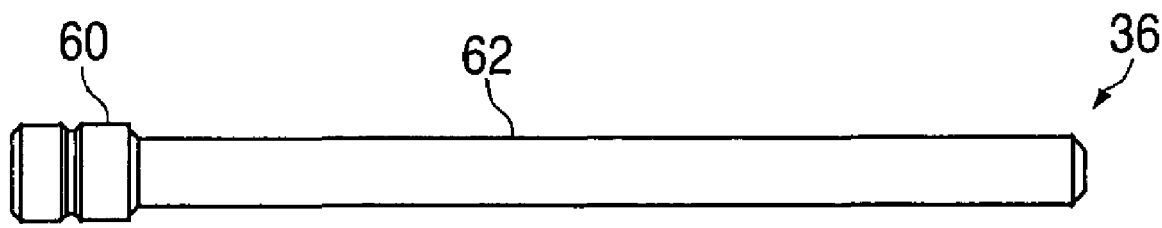
FIG. 12 is a side view of another alternative holding pin.
Figure 13:
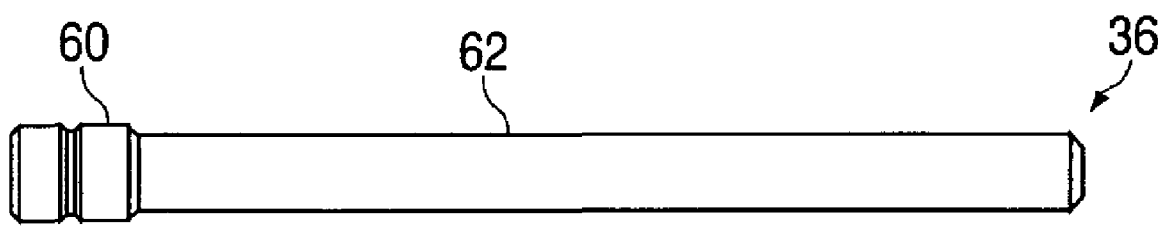
FIG. 13 is a side view of another alternative holding pin.

Turning now to FIGS. 4 and 5, the structure and operation of the belt tensioning arrangement 16 for providing alternator belt tension will now be described in further detail. FIGS. 4 and 5 illustrate the base plate 14 having the motor 22 and pulley 24. The alternator A is mounted via the alternator mounting arrangement 18. As will be described in more detail below, the alternator mounting arrangement 18 includes the turret 19 and a holding pin 36 which attaches though holes in the alternator to pivotally mount the alternator A to the holding pin 36. In the loose state shown in FIG. 4, the lower surface of the alternator A may be resting on the base plate 14.

As will also be described in more detail below, the alternator tensioning arrangement 16 includes the pivoting idler arm 26, the idler pulley 28 and the idler arm support 30. From FIG. 4, it will be appreciated that if a user operates a handle 38 which extends from the pivoting idler arm 26, and operates it in a direction shown by the arrow T in FIG. 4, the idler pulley 28 will move upward into contact with belt B and will put tension on the belt B in a configuration shown in FIG. 5. Note that due to the pivoting attachment of the alternator A via the holding pin 36, the alternator A will be rotated forward or clockwise relative to the figure, so that the lowest surface of the alternator A will be raised off of the base plate 14 if sufficient tension is applied to the handle 38.

The lever configuration of the pivoting idler arm 26 provides a lever arm movement advantage, so that a user can by operating the handle 38 manually provide a desired degree of belt tension, which will permit the alternator A to be driven by the motor 22 and facilitate testing of the alternator A.

In a preferred embodiment, a forcing device 40 such as a nitrogen gas cylinder 40 is attached at one end to the pivoting idler arm 38 and at its other end via a bracket 42 is attached to the base plate 14. The forcing device 40 is configured to apply an expansion force that tends to urge the idler arm 26 into the tighten direction T. In one example, the forcing device can be a gas strut cylinder providing approximately # pounds of linear force in the extension direction. It will be appreciated that a benefit of the use of the forcing device 40 is that it assists the user in providing tensioning force. In some embodiments, this arrangement may be designed so that when the operator releases the handle 38 the forcing device 40 will provide all or substantially all of the desired belt tension force. In such an embodiment, a user can simply release the handle 38, and the force applied to the idler arm 26 by the forcing device 40 will maintain the system with the desired belt tension. In such a situation, the operator would perform the tensioned testing in the testing configuration shown in FIG. 5, and when it is desired to remove the alternator after completing the testing the user would move the handle in a direction opposite to the direction T, against the force of the forcing device 40, thereby lowering the idler pulley 28 away from the belt B and relieving the tension so that the alternator A may be removed.

It will be appreciated that in such an arrangement, forcing devices 40 having different preload tension can be readily and conveniently substituted for each other, thereby adapting the overall tension arrangement 16 to be able to provide different belt tension as maybe desired for different belt and pulley shapes and sizes, alternator sizes, and/or motor sizes.

Turning to FIG. 6, further details of portions of the alternator belt tensioning arrangement 16 are shown. Specifically, FIG. 6 depicts that the idler arm 26 is attached to the idler arm support 30 by a pivot pin 44. The pivot pin 44 is shown with associated washers and a nut. Further, the handle 38 is a grippable device, such as for example, a rubber tube, that can be slid over a handle portion 45 that protrudes from the idler arm 26. The idler pulley 28 is shown mounted on a post 46 that extends from the idler arm 26, and retained there by a snap ring 48. A bracket 50 may be mounted to the idler arm 26, with attachment to one end of tension device 40.

Turning now especially to FIGS. 7–14, various items of the alternator mounting arrangement 18 will now be described in more detail, while also making reference to FIGS. 4 and 5. FIGS. 4 and 5 generally show the alternator mounting arrangement 18 including the turret 19 and a holding pin 36. The holding pin 36 extends through holes in ears 50 that are conventionally associated with many known alternators. Ears 50 oftentimes are arranged in parallel as shown and each have a hole therethrough which accepts a holding pin attached on the engine. Some embodiments of the invention take advantage of these mounting ears 50 to utilize a complimentary holding pin 36 to provide pivoting mounting of alternator A with respect to the base plate 14.

FIGS. 7–9 show details of the turret 19, which can be mounted directly to the base plate 14 by bolts or other suitable attachment devices. The turret 19 in a preferred embodiment is configured to removably support a holding pin 36. The holding pin 36 in some embodiments may be permanently attached to the turret 19, but in other embodiments can be attached removably. The feature of removably attaching the holding pin 36 to the turret 19 allows interchangeability of holding pins; e.g. the selection of different sizes of holding pins as will be described in more detail below. A preferred arrangement for accomplishing the removable attachment of the holding pin 36 to the turret 19, is for the turret 19 to have a turret that has a socket 52 which will receive a head portion of the holding pin 36. In order to retain the holding pin 36 after it is inserted, the preferred embodiment uses a strong magnet 54 which is press-fit into a bore adjacent the socket 52 to occupy a large part of the end of the socket 52.

Turning to FIGS. 10–14, a plurality of different configurations of different holding pins 36 are illustrated in the respective figures. Each holding pin 36 has a head 60. The function of the head 60 is to be inserted into the socket 52 of the turret 19. The holding pin 36 also has an elongated extension 62. When the head 60 is inserted into the socket 52 of a turret 19, the magnet 54 applies a strong magnetic attraction on the head 60 pulling it inward into the socket 52 and resisting removal, so that the holding pin 36 is retained removably by the turret 19. The holding pin 36 may be of any suitable material, but in an embodiment using a magnetic mounting, at least the head 60 should be of a magnetically attractive material. In one preferred embodiment, the holding pin 36 is nickel plated steel. The magnet 54 can be selected so that it provides a retaining force that can be overcome manually by a user. Of course, other removable attachment arrangements other than a magnet can be used, including a set screw other threaded or locking arrangements.

Figure 14:
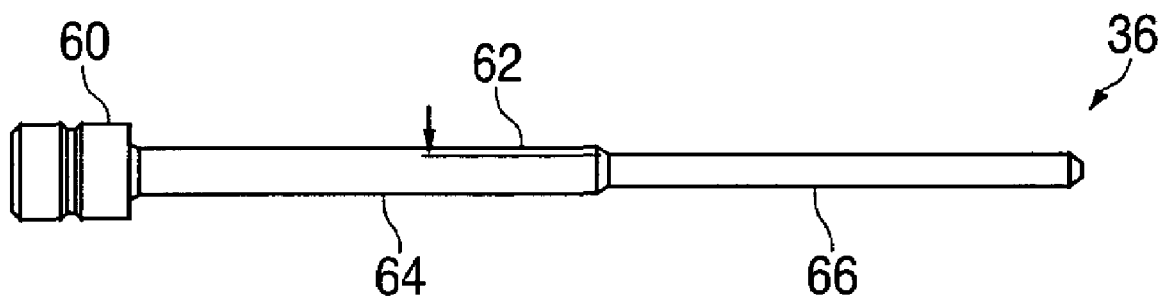
FIG. 14 is a side view of another alternative holding pin.

FIGS. 10–13 illustrate mounting pins 36 each having head 60 and extension 62, with each extension 62 being of constant diameter along its length. However, the pin embodiment of FIGS. 10–13 differ in that the extension 62 is of a different diameter in each respective figure. Therefore, it will be appreciated the mounting arrangement 18 consisting of the turret 19 and the holding pin 36, can be readily reconfigured with different diameter holding pins 36 in order to accommodate for example alternators having different size holes in their respective ears 50. Also, different length pins 36 can be used where the distance between ears 50 needs to be accommodated. The embodiment of FIG. 14 shows a holding pin 36 having a head 60 similar to the heads of the other pins shown in FIGS. 10–13, but having an extension 62 that has a step dimensional profile in order to fit alternators where one ear has a larger diameter hole than the diameter of the hole of the other ear. The step profile 52 includes a larger diameter portion 64 and a smaller diameter portion 66.

Figure 16:
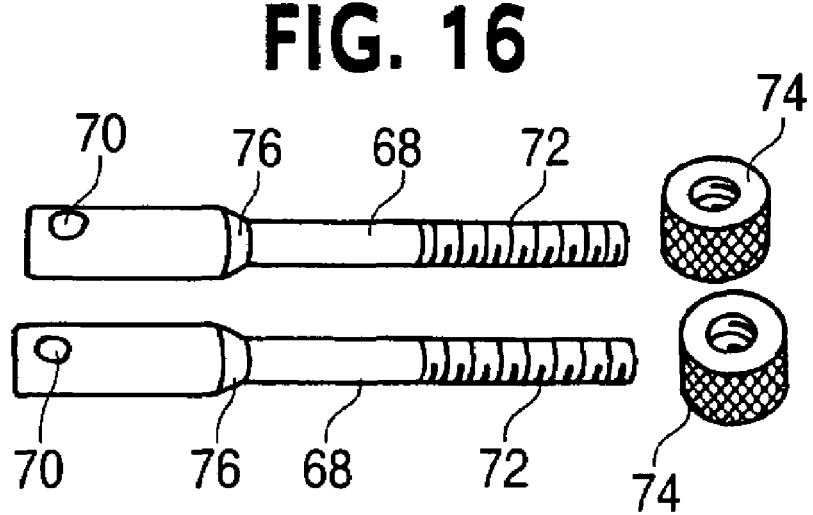
FIG. 16 is a perspective view of two vertical holding pins and associated speed nuts.
Figure 17:
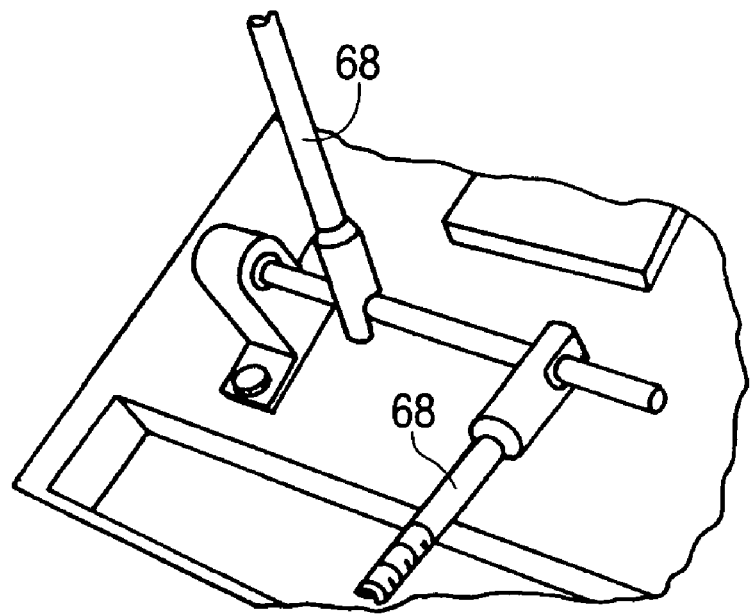
FIG. 17 is a perspective view of a mounting arrangement including a turret holding a pin and a pair vertical holding pins.
Figure 18:
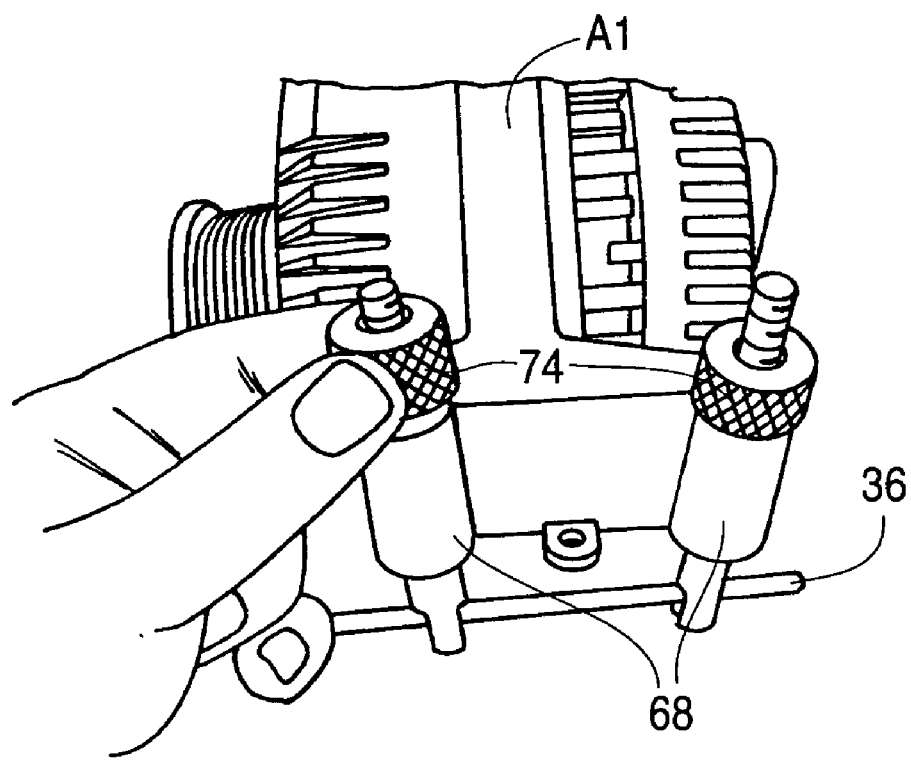
FIG. 18 is a perspective view showing the arrangement of FIG. 17 with an alternator being secured with speed nuts.
Figure 20:
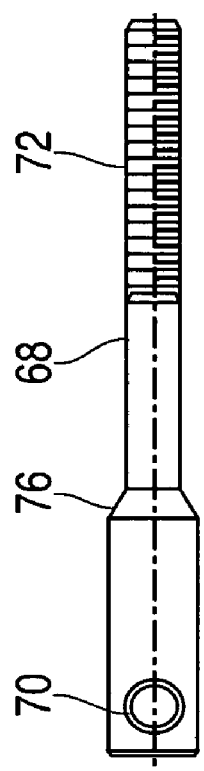
FIG. 20 is a side view of the vertical holding pin of FIG. 19.
Figure 19:
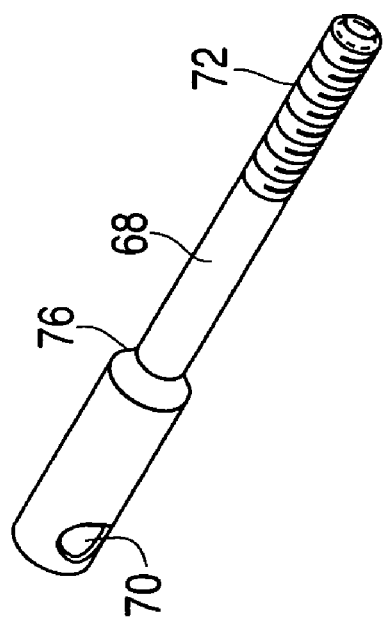
FIG. 19 is a perspective view of a vertical holding pin.

The alternator A shown in FIGS. 4 and 5 is configured with its ears designed to accept a single shaft that is parallel to the central shaft of the alternator. This type of alternator A is tensioned in it automotive installation by being pivoted about its installation post and then fixed using a bolt going through ear 70 (see FIG. 4). Turning now to FIGS. 16–23, some additional mounts and arrangements are illustrated, which facilitate the mounting of those alternators that are configured with their mounting ears and mounting holes at a 90 degree angle to the type of alternator shown in the previous figures. Another known alternator type A1, as shown in FIG. 18, has two bosses 68 which each have a hole therethrough designed to accept a mounting post. This type of alternator A1 may be referred to as a vertical mounting alternator.

The present invention provides embodiments where alternators A1 having this mounting boss arrangement 68 can be tested using the mounting arrangement 18 with vertical holding pins 58. As shown in FIG. 16, each vertical holding pin 68 has a lower end that has a bore 70 therethrough opposite a threaded portion 72. The bore 70 is dimensioned to relatively snugly fit around a chosen size of post 36. Speed nuts 74 are used in conjunction with the vertical holding pins 68. FIGS. 15–18 illustrate the process for mounting a vertical mount alternator A1 onto the holding arrangement 18 using vertical holding pins 68.

Figure 15:
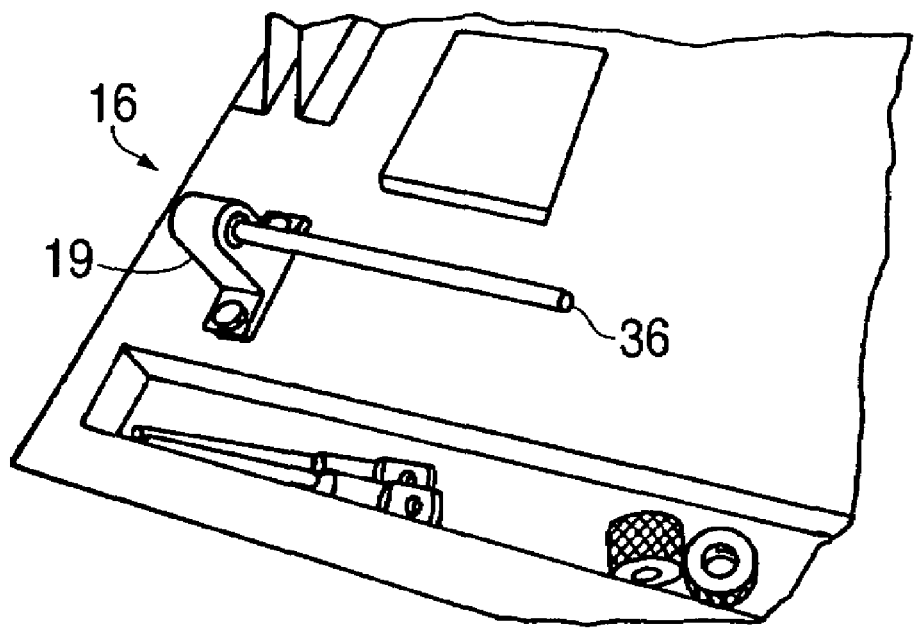
FIG. 15 is a perspective view of a mounting arrangement including a turret and a holding pin.

FIG. 15 illustrates a turret 19 supporting a holding pin 36. In FIG. 17, the user has slid a pair of vertical holding pins 68 so the holding pin 36 is projecting though each of the respective bores 70. The user then aligns the vertical holding pins 68 parallel to each other and slides an alternator A1 over the treaded portion 72 shown in FIG. 18. Each vertical holding pin 68 has a shoulder 76 as shown in FIG. 16 which is larger than the diameter of the of the hole in the alternator so the boss of the alternator will rest on the shoulder 76. It will be appreciated that by providing a tapered shape to the shoulder 76, alternators having different hole sizes will still tend to have a self-centering relationship with the vertical holding pins 68, so that the vertical holding pin 68 underload will tend to become self-centered in the hole. This self-centering action is further facilitated by the sliding relationship between the bore 70 along the length of the vertical holding pin 36. When the alternator A1 has been slid over the vertical holding pins 68 in the configuration shown in FIG. 18, a speed nut 74 is then tightened on the threaded portion 72 of each vertical holding pins 68 threads.

Figure 21:
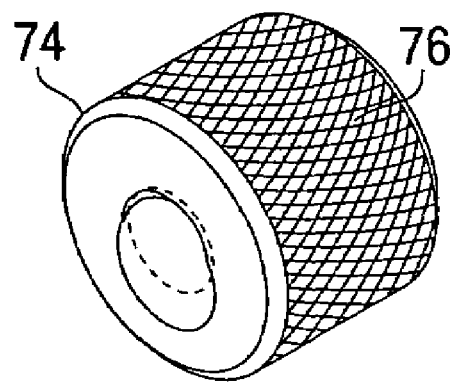
FIG. 21 is a perspective view of a speed nut.
Figure 22:
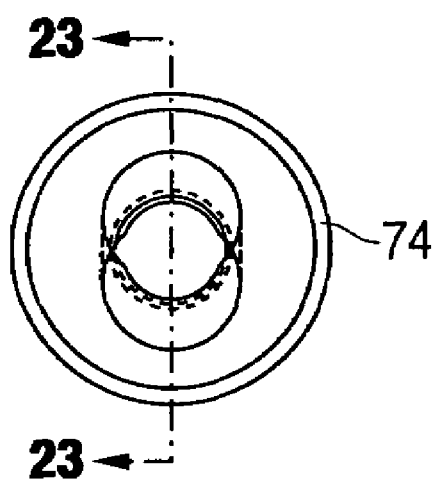
FIG. 22 is an end view of the speed nut of FIG. 21.
Figure 23:
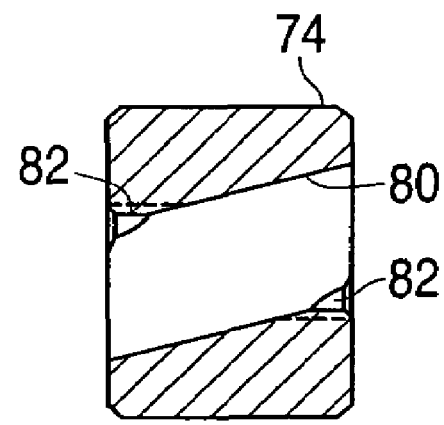
FIG. 23 is a cross sectional view of the speed nut taken through line 23—23 of FIG. 22.

In some embodiments, a conventional nut can be used. However, in some embodiments faster installation may be achieved using a speed nut 74. FIGS. 21–23 illustrate an exemplary speed nut 74. The speed nut 74 illustrated has a narrowed outer-cylindrical surface 76 that is knurled because it is adapted for rapid hand tightening, or could alternatively have a hexagonal or other grippable surface. One way of manufacturing the speed nut 74 is to first drill and tap a conventional threaded section axially through the center of the speed nut 74. Then, a bore 80 is drilled in at an angle to the axis of the speed nut 74. The bore 80 has a diameter slightly greater than the outer diameter of the threads the threaded portion 72 of the vertical holding pin 68 which speed nut is designed accept. A completed speed nut 74 as illustrated in FIGS. 21–23 thus includes residual threaded portion 68 as shown.

In order to use the speed nut 74, the operator can hold the speed nut 74 at an angle as shown in FIG. 18, at which point the bore 80 is large enough to slide over the threaded portion 72 of the vertical holding pin 68. As the lower end of the nut contacts the top surface of the alternator boss 69, the force of gravity, and a little urging from the operator if necessary, will cause the speed nut 74 to cam so that it tends to tilt into a flat position at which point the opposed threads 82 come into engagement with the threads 72 at which point, rotation of the nut in a tightening direction causes the nut 74 to further tighten. At a final tightening point, the speed nut 74 will continue to cam over into a relatively flat engagement with top surfaces the boss 69, and the threads 82 will be in full engagement with the threads 72.

It will be appreciated that the speed nut 74 provides an advantage where the user does not have to spin the nut 74 over what may be relatively long length of exposed threads 72. This provides another benefit of the invention, wherein different lengths of bosses 69 in the vertical direction can be quickly accommodated without the user needing to spin the nut 74 over a long thread length in the case of a short boss 68. Also, the vertical holding pins 68 can be selected from different interchangeable lengths and/or diameters.

Figure 24:
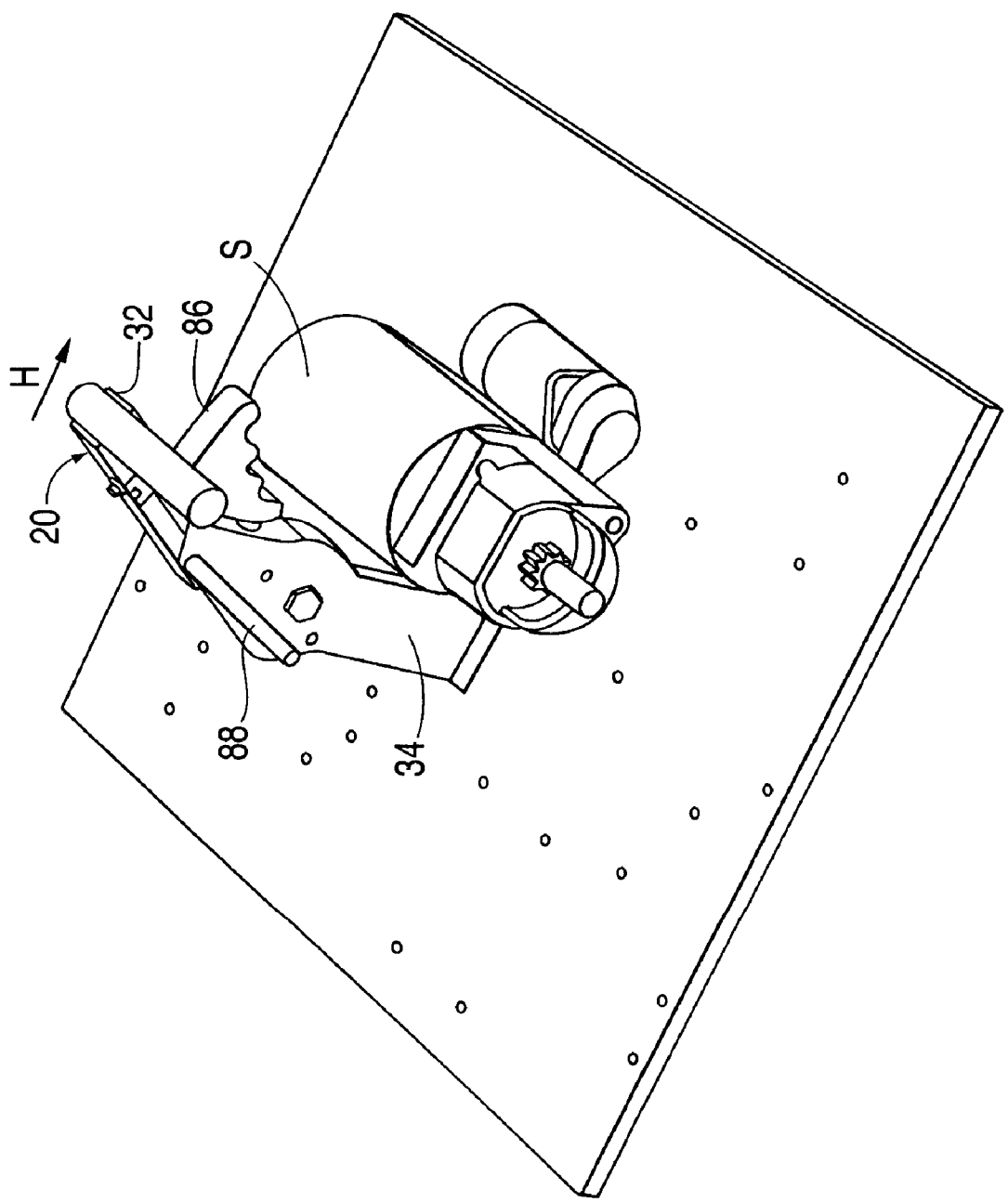
FIG. 24 is a perspective view of a starter motor holder arrangement in an open position.
Figure 25:
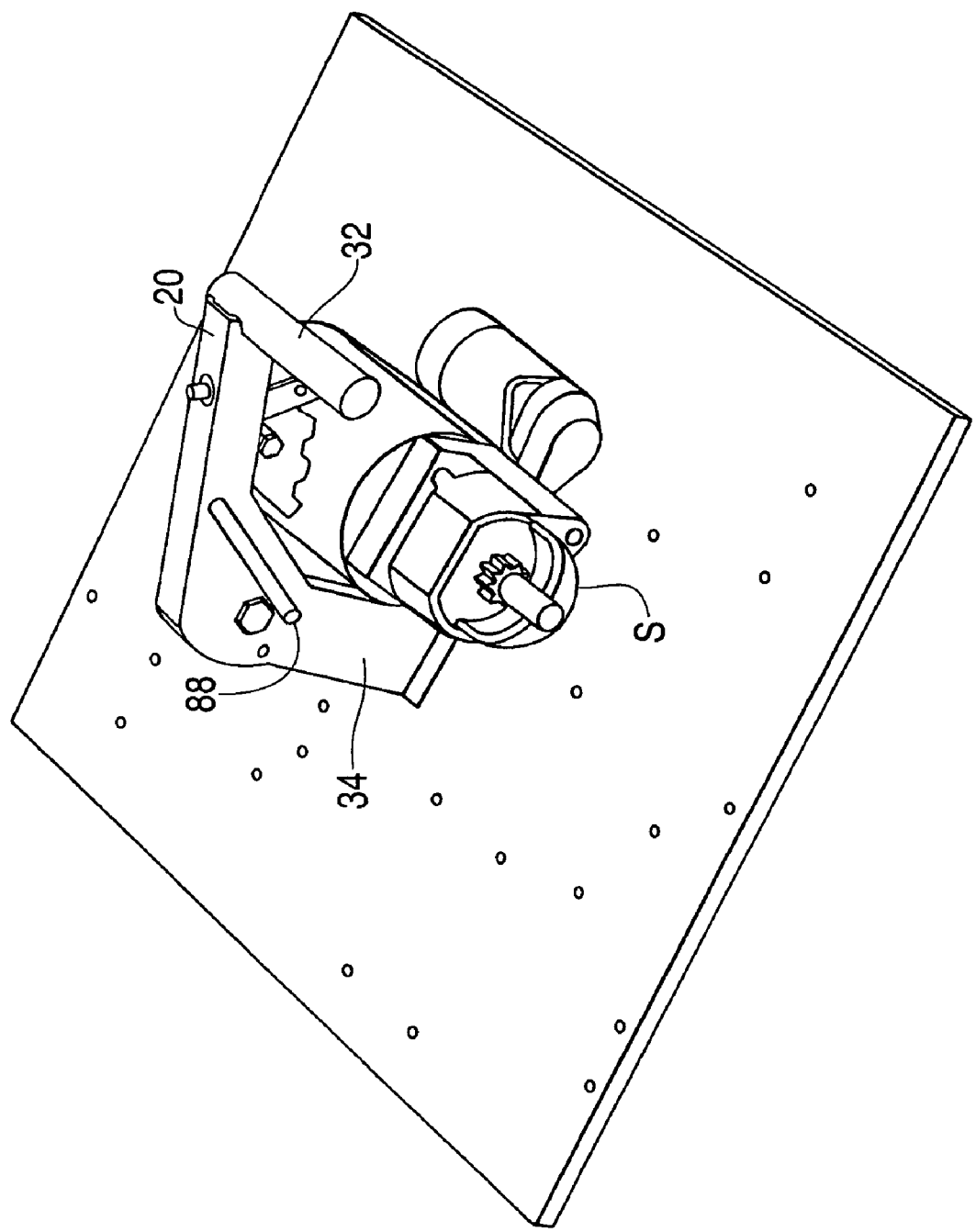
FIG. 25 is a perspective view of the starter motor holder arrangement of FIG. 24, in a clamped position.
Figure 26:
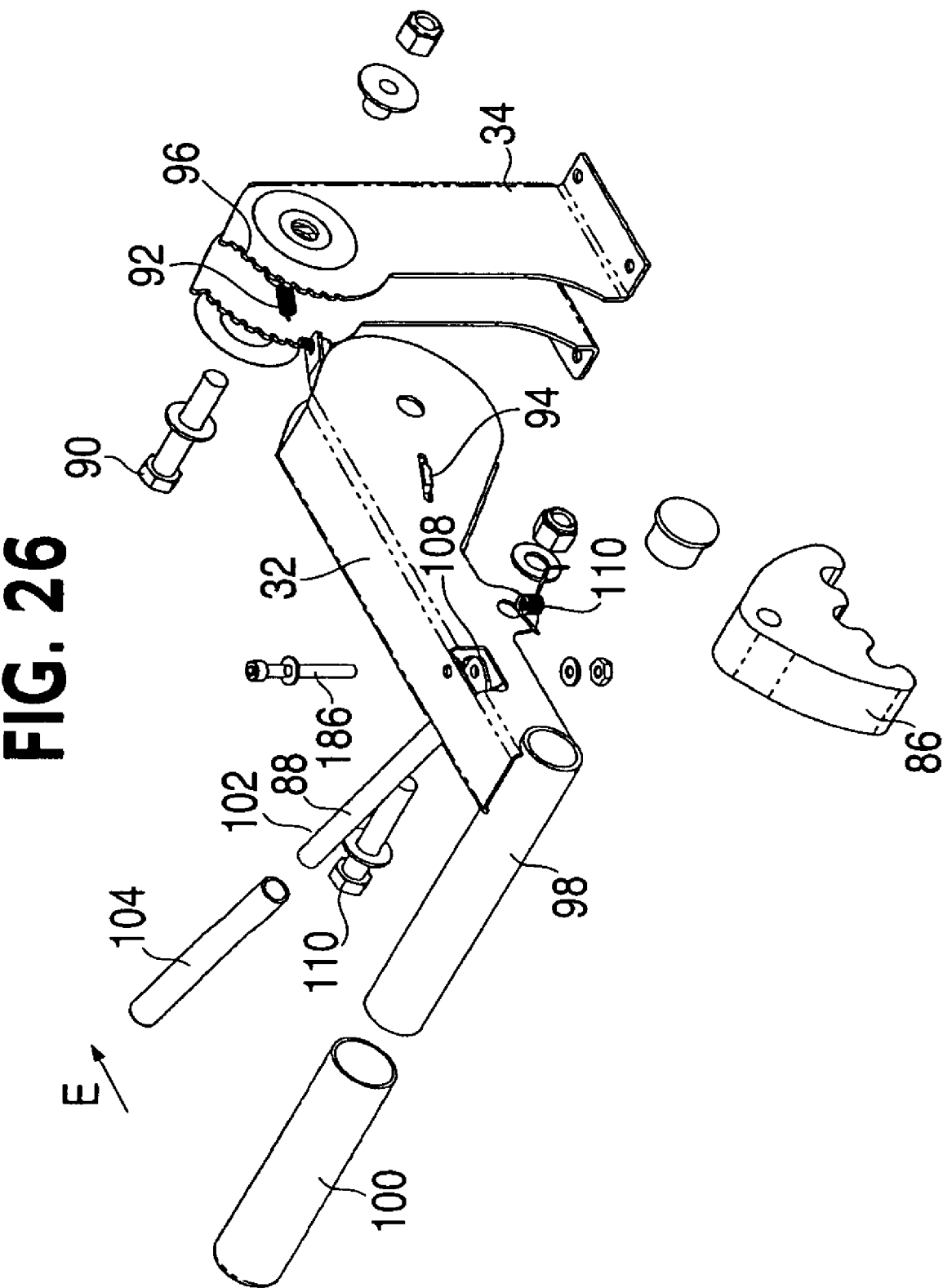
FIG. 26 an exploded view showing portions of the starter motor holder arrangement of FIG. 24.
Figure 27:
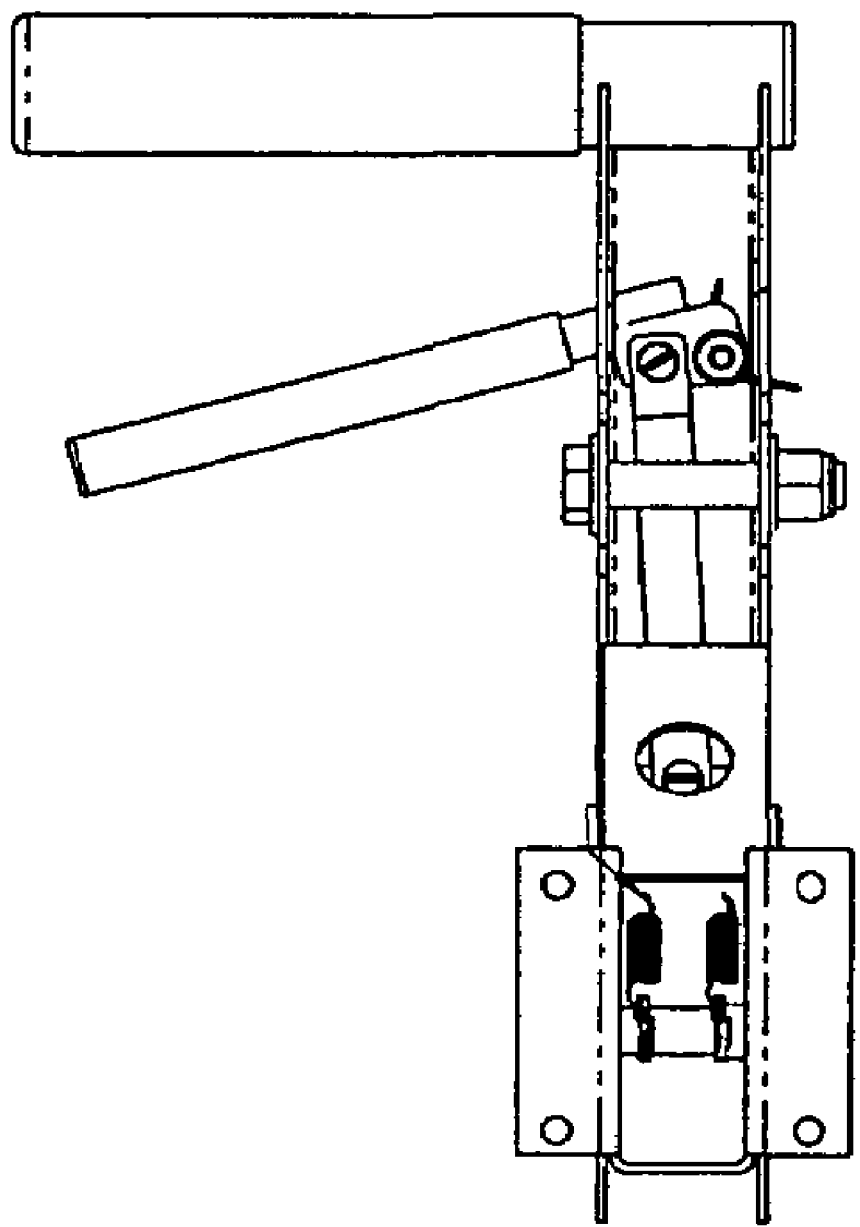
FIG. 27 is a top view of a starter holder arrangement shown in FIG. 26.

FIGS. 24–26 show further detail of the starter holding clamp 20. Starter holding clamp 20 is shown in an open unclamped state in FIG. 24. Initially the starter motor S is rested on the pad 21 (see FIG. 1) which is a resilient pad that may have a generally concave shape so that the starter motor will rest on it. Next, the starter holder clamp 20 includes a ratcheting hold down arm 32 which is pivotally mounted on a hold down arm support 34. As will be described in more detail below, the user urges the handle in the direction shown by the arrow H in FIG. 24 so that a engaging pad 86 on the hold down arm 32 comes into contact with the top of the starter motors as shown in FIG. 25. The operator is able to engage the hold down arm 32 in the position shown in FIG. 25 so that the starter motors is held by compressive force applied by the lower pad 21 and/or the upper pad 86. One or both of lower pad 21 and/or the upper pad 86 maybe made of an appropriate resilient and/or gripping type of material that can be compressed by force from the hold down arm 32 so that the starter motor is held in place between these two pads. A release lever 88 is provided, activation of which will release the ratchet so the hold down arm 32 may be raised and the starter may be removed.

Further details of the starter holder 20 will now be described with reference to FIGS. 24–26 and particularly FIG. 26, which illustrates the hold down arm 32 being pivotally mounted the hold down arm support 34 by a pin 90 and associated washer and a bolt. A return spring 92 is connected a one end to the support 34 and at its other end to a sliding pawl 94 that is trapped for sliding motion by slots in the hold down arm 32. It will be appreciated that the sliding pawl 94 engages ratchet teeth 96 provided on the support 34. The ratchet teeth 96 are shaped such that when the arm 34 is urged downwardly, the pawl 94 freely slides with a clicking motion over the teeth 96. However, due to the effects of the return spring 92 and the rake of the teeth 96, the pawl 94 does not travel upwardly unless a release of the ratchet action is present.

Further, the arm 32 also includes a handle portion 98 which has a grippable cover 100 slideable thereover. A ratchet release arm or handle 102 which may feature an extension 88 having a grippable cover 104 is pivotally mounted to the hold down arm 32 by a pin 106. The handle 102 has an extension 108 that permits the pin 106 to provide the pivotal mounting. The handle 102 further has a return spring 110 that biases the handle 102 in the direction E shown in FIG. 26. Accordingly, both the return spring 92 and the return spring 110 tend to move the handle 102 in the direction designated by the arrow E in which the pawl 94 will engage the ratchet teeth 96. The handle 102 is connected by a cable or other device to the pawl 94 so that moving the handle 102 in the direction that is opposite to the direction E (e.g. by pulling handle 102 toward the handle 98) causes the cable or other linkage connection to pull the pawl 94 away from the teeth 96 permitting free upward movement of the hold down arm 32. The pad 86 is mounted to the underside of the hold down arm 32 by a bolt 110 and associated washers and nut.

Turning now to FIG. 24 and 25, it will be appreciated that from the position in FIG. 24, the operator urges the hold down arm 32 downward far enough to compress the pad 21 and 86, and when the operator releases the hold down arm 32 the ratchet will hold the hold down arm 32 down in this compressed position so as to hold the starter S in place. The starter S is now held firmly and also resiliently so that a current may be applied to the starter S and diagnostic measures may be performed.

In order release the starter, the user urges the handle 102 manually in the direction towards the handle 98 so as to retract the pawl 94 and permit manual raising of the hold down arm 32 to release the starter S. Releasing the handle 102 will permit the hold down arm 32 to be held in an upward non-engaging position such as shown in FIG. 24 by virtue of the ratchet action.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. An apparatus for supporting an alternator for testing, comprising:
   a base;
   a turret having a socket defined therein with the socket having an opening and a closed back wall opposite the opening; and
   a holding pin having two ends with a head at one end adapted to be inserted into the socket and retained therein, and an elongated extension portion that extends from the turret when the head is inserted in the socket, wherein the extension portion engages with a portion of the alternator.

2. The apparatus of claim 1, further comprising a magnet disposed as part of the back wall of the socket and configured to magnetically attract the head when the head is inserted into the socket.

3. The apparatus of claim 1, wherein the head has a larger diameter than a diameter of the elongated extension portion.

4. The apparatus of claim 1, wherein the extension portion is of a constant diameter.

5. The apparatus of claim 1, wherein the extension portion comprises two regions of different diameters from each other.

6. The apparatus of claim 1, further comprising a base plate to which the turret is mounted.

7. The apparatus of claim 6, further comprising a magnet disposed as part of the back wall of the socket and configured to magnetically attract the head when the head is inserted into the socket.

8. The apparatus of claim 7, wherein the magnet is inserted into a recess in the back wall of the socket.

9. The apparatus of claim 7, further comprising a base plate to which the turret is mounted.

10. An apparatus for supporting an alternator for testing, comprising:
    a base;
    mounting means having a socket defined therein with the socket having an opening and a closed back wall opposite the opening; and
    a holding pin having two ends with a head at one end adapted to be inserted to the socket and retained therein, and an elongated extension portion that extends from the mounting means when the head is inserted in the socket, wherein the extension portion engage with a portion of the alternator.

11. The apparatus of claim 10, further comprising a magnet disposed as part of the back wall of the socket and configured to magnetically attract the head when the head is inserted into the socket.

12. The apparatus of claim 10, wherein the head has a larger diameter than a diameter of the elongated extension portion.

13. The apparatus of claim 10, wherein the extension portion is of a constant diameter.

14. The apparatus of claim 10, wherein the extension portion comprises two regions of different diameters from each other.

15. The apparatus of claim 10, further comprising a base plate to which the mounting means is mounted.

16. A method for supporting an alternator for testing, comprising:
    a base;
    inserting a holding pin into a turret having a socket defined therein with the socket having an opening and a closed back wall opposite the opening, and with the holding pin having two ends with a head at one end adapted to be inserted to the socket and retained therein and an elongated extension portion that extends from the turret head; and
    engaging the holding pin with a portion of the alternator.

17. The method of claim 16, further comprising magnetically attracting the head when the head is inserted into the socket, via a magnet disposed as part of the back wall of the socket.

18. The method of claim 16, wherein the extension portion is of a constant diameter.

19. The method of claim 16, wherein the extension portion comprises two regions of different diameters from each other.

20. The method of claim 16, wherein the engaging step further comprises inserting the holding pin through at least one hole in an ear of the alternator.

* * * * *